INVENTOR.
Alf Lysholm

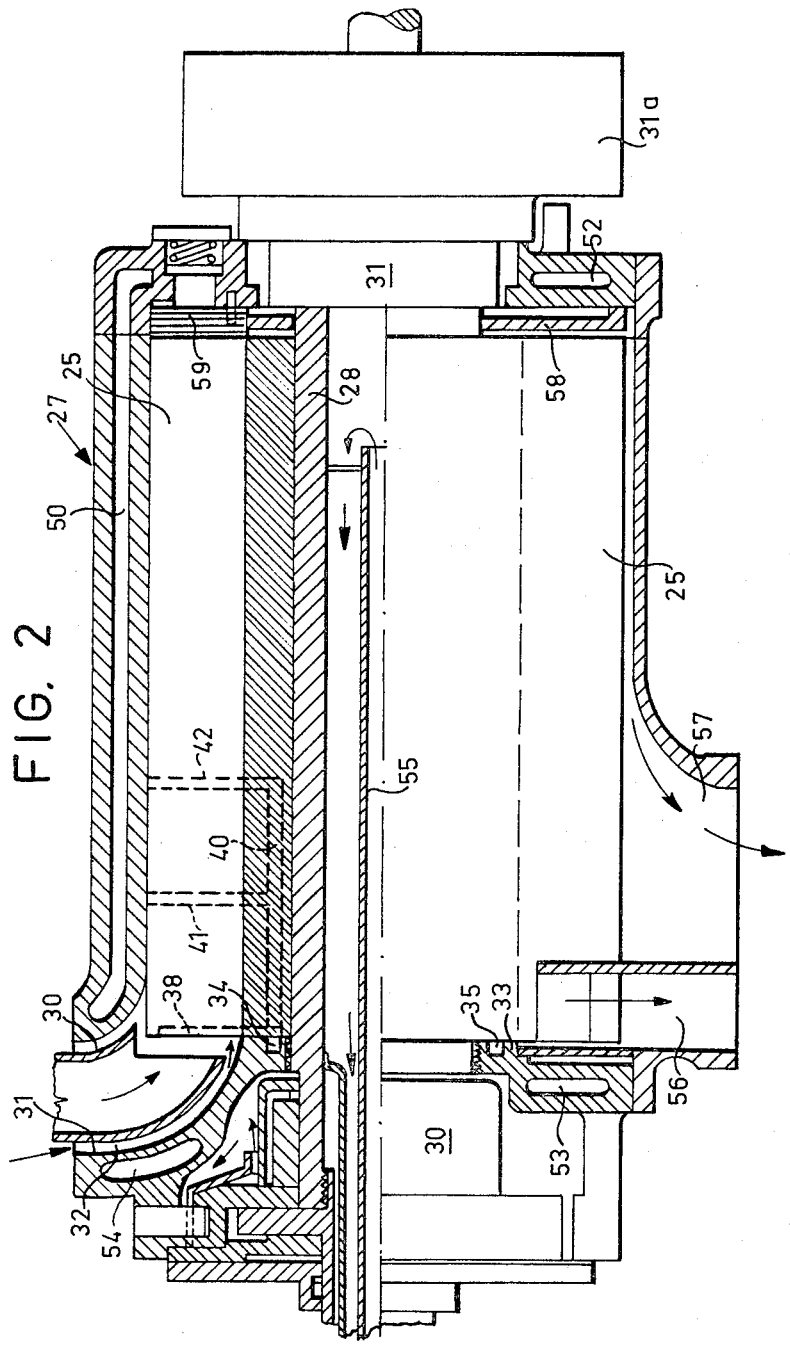

United States Patent Office 3,405,604
Patented Oct. 15, 1968

3,405,604
METHOD OF DRIVING A SCREW ENGINE POWER UNIT AND A POWER UNIT TO BE DRIVEN ACCORDING TO SUCH METHOD
Alf Lysholm, Karlaplan 43, Stockholm, Sweden
Filed May 11, 1966, Ser. 549,250
Claims priority, application Sweden, May 14, 1965, 6377/65
13 Claims. (Cl. 91—84)

ABSTRACT OF THE DISCLOSURE

A method and apparatus for cooling a screw turbine is disclosed, and the cooling is sufficient to enable the screw turbine to receive and utilize a high temperature (above 1200° C.) motive fluid from a compressor. The method and apparatus provide for a cooling of the screw turbine by a combination of air and liquid cooling. Liquid is circulated for cooling the casing of the screw turbine and the central portions of its rotors; and air is supplied to the screw turbine to form a combined veil, boundary layer and blocking air cooling which insulates the rotors from the high temperature motive fluid.

---

The present invention relates to a method of driving a screw engine power unit comprising a screw turbine fed by a motive fluid of high temperature. Such units are previously known, for example from U.S. Patents Nos. 2,799,253 and 2,808,813, but hitherto it has not been possible to practically employ such power units because the thermodynamic efficiency of the same has been too low.

The invention is based on the knowledge that in order to compensate for said efficiency it is necessary to raise the thermal efficiency of the screw turbine by increasing the inlet temperature of the motive fluid supplied thereto. This will certainly increase the cooling losses themselves but on the other hand it will be possible to obtain a considerably greater specific capacity, approximately three to four times the specific capacity of an ordinary gas turbine in which the temperature of the motive fluid for reasons of strength is limited to about 900° C. The air consumption under such conditions should correspond to that of the modern Diesel engine. The thermal efficiency of a screw engine power system or unit with increased motive fluid temperature should under such conditions correspond to the efficiency of an Otto-engine without heat exchanger and of a diesel engine having a heat exchanger.

A higher motive fluid temperature will however involve greater cooling problems and the object of the invention is therefore to provide a method of cooling a screw turbine operating with increased motive fluid temperature in order to enable a method of driving a screw engine power system in accordance with the invention.

Previously known systems for cooling a screw turbine are based either on air cooling or on liquid cooling. In the first instance it has been difficult to obtain high efficiency because of the fact that an insufficient cooling of the rotors and housing has necessitated that the required clearance between the rotors and the housing in operation has been great in order to avoid warpings and the like due to the relative heat expansions of the components. This in turn has resulted in considerable leakage which in a high degree has reduced the efficiency for turbines cooled in such a manner.

A liquid cooling of the rotors as well as of the housing on the other hand enables one to obtain about the same temperature in both the rotors and in the housing and due to this it is possible to obtain a small clearance and a leakage reduction as a result thereof. This will however result in relatively great cooling losses, particularly at a comparatively low temperature of the motive fluid of the order which is employed in gas turbines which may be explained by the fact that the boundary layer temperature between cooperating surfaces is completely controlled by the heat transmission capacity of the various metal components. With such a cooling of a screw turbine it is consequently not possible in another way than the pure conventional way of liquid cooling to influence on the boundary layer temperature. As a result thereof air cooling has as a rule been preferred in later known embodiments of cooling systems for screw turbines.

According to the present invention the characteristic advantages of the known cooling systems have been combined according to a method of driving a screw engine power unit including a screw turbine fed by motive fluid at temperatures higher than 1200° C., preferably about 1500° C. or higher, the invention being characterized substantially in that for utilizing the high inlet temperature of the motive fluid by the screw turbine a combined air and liquid cooling is employed which is carried out in such a manner that the housing and the central portions of the rotors of the screw turbine are cooled with a liquid whereas the high temperature end of the screw turbine and the inlet portion, respectively, are cooled and insulated, respectively, from the hot motive fluid by supply of cooling air.

According to the method of cooling in accordance with the invention the supply of cooling media is controlled with respect to temperature and amount in such a way that the housing and the rotors upon operation obtain a metal temperature of the order of 100° C. to 400° C., providing an evenly distributed cooling so that the temperature difference between the rotors of the screw turbine and the housing may be kept lower than previously known and that the heat expansion of said components may be so adapted to the cooling losses of the turbine that an optimal efficiency is obtained for the screw engine power unit.

A screw engine power unit driven according to the method of the invention includes besides the screw turbine a compressor which is connected to a heat exchanger to feed a combustion chamber in which the high temperature motive fluid is produced for feeding the screw turbine.

To cool a screw turbine according to the principles of the invention the above metal temperature of 100° C. to 400° C. is obtained mainly by means of a circulating liquid cooling whereas cooling air taken from the compressor or compressors is at the same time supplied to the housing and the rotors in channels formed therein in order to form combined veil, boundary layer and blocking air cooling which functions as an insulating layer for the surfaces of the rotors and the housing exposed to the hot motive fluid.

By means of a screw turbine cooled in accordance with the principles of the invention the heat flow to the housing and the rotors is reduced which is of considerable importance because the heat transfer is more dependent on the boundary layer temperature than on the temperature of the motive fluid.

Low pressure air in a screw engine power system driven in accordance with the invention may be obtained by means of one or more dynamic low pressure compressors or by means of one or more screw compressors. In the first instance the driving of the compressor or the compressors is obtained by means of a low pressure turbine particularly constructed therefor, said last mentioned turbine being via an intermediate part connected to the outlet channel of the screw turbine for utilizing the residual toe energy in the exhaust gases. In some cases it may, however, be desirable to employ a free screw turbine for driving the low pressure compressor.

When using a screw compressor for producing the low pressure the driving of said compressor is carried out by direct connection to either of the two rotors of the screw turbine.

In a power unit having a low pressure compressor, a high pressure compressor of the screw wheel type will be fed, possibly through an intermediate cooler, by the low pressure compressor, said high pressure compressor being connected to either of the rotors of the screw turbine to be driven thereby. The high pressure compressor may be cooled in the same way as the screw turbine but the requirement of such cooling is not of the same importance for the screw engine power unit capacity.

When employing dynamic machines on the low pressure side a considerably reduced weight and dimension of the total screw engine power unit is obtained. However, in this case it is necessary to consider that the inlet temperature at the low pressure turbine must not raise above the permissible temperature for dynamic gas turbines, i.e., at present 850° C. to 900° C., which results in that the temperature of the gaseous fluid at the outlet from the screw turbine must not raise above said temperature because the outlet channel of the screw turbine is directly or indirectly, through an intermediate part, connected to the low pressure turbine.

The liquid cooling is carried out by means of circulating cooling liquid and in a manner known per se optimal cooling capacity is obtained by sub-cooled boiling, i.e. small steam particles are formed which thereafter are condensed again.

With respect to the method of carrying out cooling it is also possible in a manner known per se to boil the cooling liquid and to lead the steam generated to a turbine or to utilize it in the screw turbine itself. Hereby the possibility has been given to increase the efficiency as well as the specific capacity considerably over a diesel engine having the corresponding data. When the steam is supplied to the screw turbine it may also be utilized as a cooling medium and it may be mixed with hot gas. In this case the steam is lost, and accordingly a corresponding amount of water must be added.

The invention also relates to a screw turbine suitable for carrying out the method according to the invention, said screw turbine comprising a pair of cooperating male and female rotors having inter-engaging screw-shaped lobes and grooves for forming expansion chambers which receive hot motive fluid from an inlet on one side of the housing of the screw turbine and which exhaust expanded motive fluid to an outlet on the opposite side of the turbine housing. According to the invention such screw turbine is characterized in that cooling liquid channels are provided in the central portions of the rotors or in their shafts and in the longitudinal half portion of the housing located on the same side as the inlet, and in that the housing as well as the rotors are provided with cooling air channels, some of them having their outlets directed to the intermediate space between the end walls of the housing and the end surfaces of the rotors so that the air at these places may be utilized as cooling and blocking air and some of the channels extend into the rotors and have their outlets located at the tops of the rotor lobes in order to effect a veil cooling at least at the inlet end of the turbine.

In a screw turbine constructed according to the principles of the invention a cooling air channel may have its outlet provided in that end wall of the housing located adjacent the inlet and be provided in such a way that said outlet will direct the cooling air flow into those pockets which are formed between the sides of the lobes upon a certain rotation of the same from the middle position.

The following description with reference to the annexed drawings will more in detail describe a preferred screw engine power unit adapted for carrying out the method according to the invention and from this description further characterizing features of the invention will be more clearly understood.

FIG. 2 is a diagrammatical longitudinal section of the housing and a partial section of the male rotor of the screw turbine of the power unit in FIG. 1.

Figure 1:
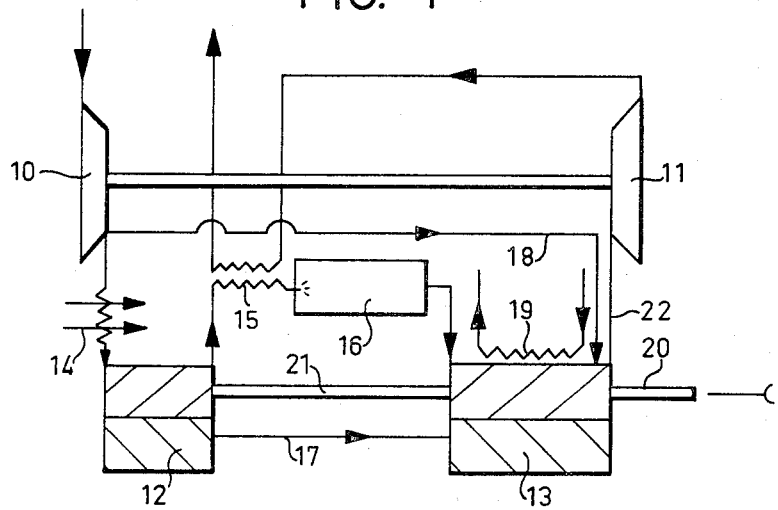
FIG. 1 shows a coupling diagram of a screw engine power unit driven according to the invention and having a power of 300 to 1000 HP.

From the example shown in FIG. 1 it will be understood that a dynamic low pressure compressor 10 is driven by a dynamic low pressure turbine 11 and that a high pressure compressor 12 of the screw wheel type is driven by the screw turbine 13 constructed according to the invention. In operation air is sucked into the low pressure compressor 10 which will compress the air to a pressure of 4 kg./cm.$^2$ above atmospheric pressure and which through an intermediate cooler 14 will feed the high pressure compressor 12. From the high pressure compressor 12 the air is led at a pressure of for instance 16 kg./cm.$^2$ above atmospheric pressure through a heat exchanger 15 to a combustion chamber 16 into which fuel is simultaneously injected.

In accordance with the invention the screw turbine 13 is cooled in a manner to permit a temperature of the hot motive fluid at the inlet of the screw turbine which is more than 1200° C., preferably of the order of 1500° C. or more.

The cooling of the screw turbine is effected by means of a combined liquid and air cooling as will be described more in detail below. The cooling air is taken from the high pressure compressor 12 and the low pressure compressor 10 and is led through conduits 17 and 18, respectively, into air cooling channels in the screw turbine 13.

The cooling liquid such as for instance water is circulated through liquid cooling channels in the screw turbine as diagrammatically indicated by the line 19 in FIG. 1.

The male rotor or the female rotor of the screw turbine 13 may have a shaft which at one end forms the power take off 20 and at the other end is drivingly connected by a shaft 21 with the high pressure screw wheel compressor 12.

The exhaust gases leaving the screw turbine may have a temperature of about 850° C. and are led through a conduit 22 to the low pressure turbine 11 of the unit in FIG. 1, the turbine 11 thus forming an exhaust gas turbine.

Figure 4:
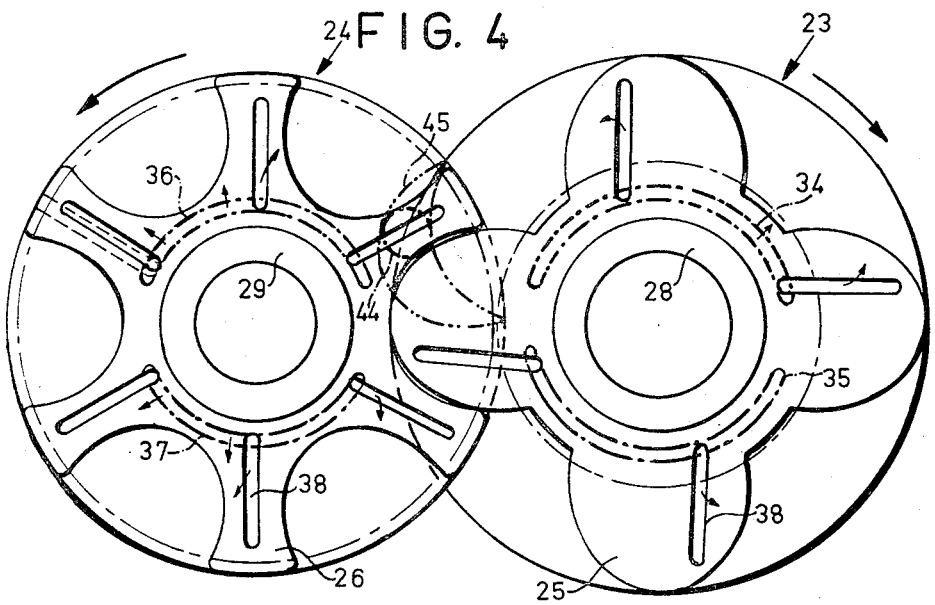
FIG. 4 is an end view of the inlet end of the male and female rotors having particularly suitable lobe profiles.
Figure 3:
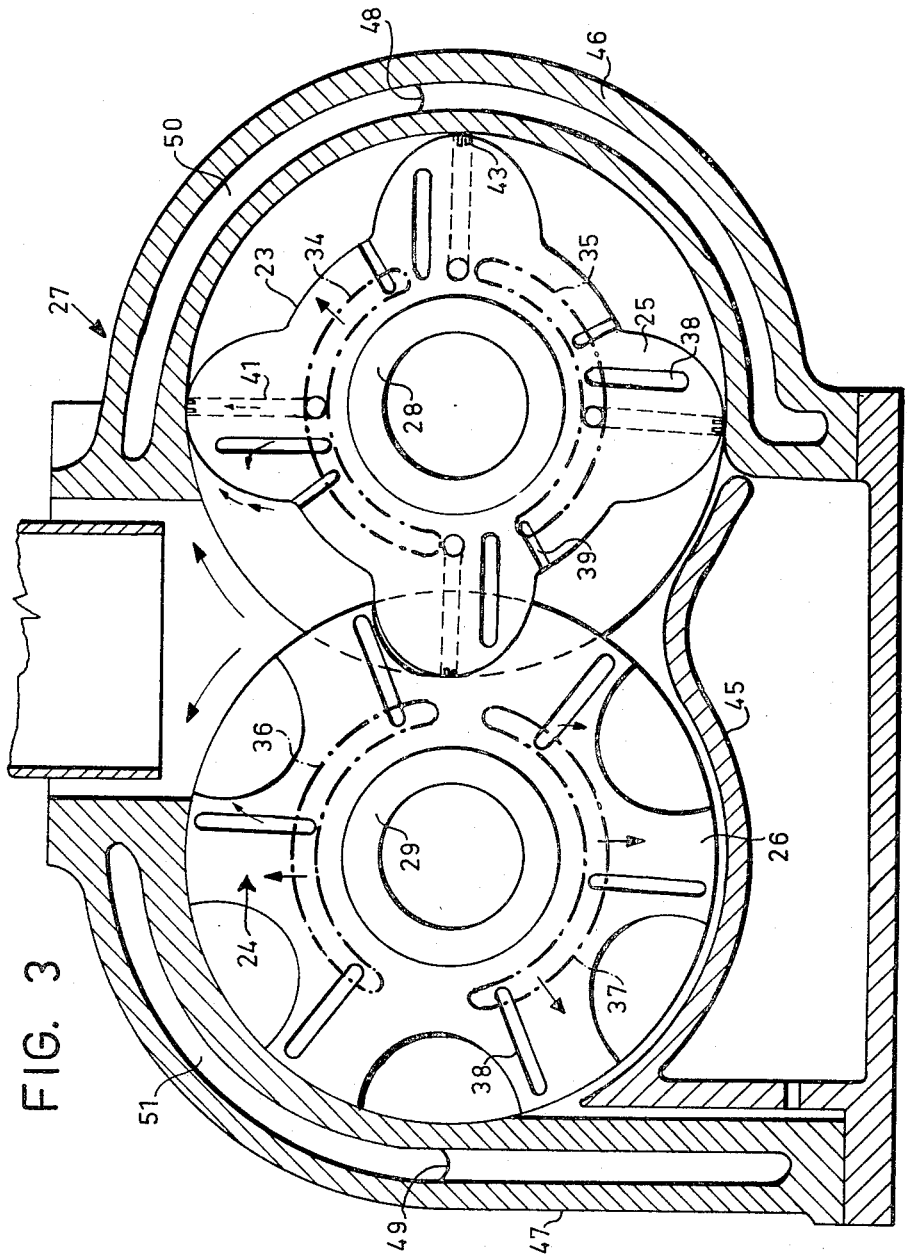
FIG. 3 is a diagrammatic end view of the rotors and a cross-section of the housing of the screw turbine.

The screw turbine shown in FIGS. 2 to 4 is of the known kind comprising a male rotor 23 and a female rotor 24 having intermeshing helical lobes 25 and 26, respectively, and grooves. The rotors are rotatably mounted in two intersecting bores of a housing 27 so that the lobes and grooves of the rotors together with the bores form expansible working chambers which vary in volume upon rotation of the rotors. Such screw turbines or engines are described in detail in for instance U.S. Patents 2,174,522, 2,755,990, 2,799,253, 2,801,792, 2,845,777 and 2,873,909. The screw turbine according to the invention will therefore be described substantially merely as to its new features over the prior art.

In FIG. 2 the lobes 25 of the male rotor are shown as axial cams in order to simplify the illustration of the cooling channels in the rotor lobes although the lobes are actually formed as screw threads.

In order to avoid different expansions of the rotors, the material of the rotors should have a high thermal conductivity and may for instance be of aluminum, tin or Corson bronze. In the embodiments shown the lobes of the rotors are solid. The rotors have a central bore for hollow shafts 28, 29 supporting the rotors and being rotatably mounted in bearings 130, 131.

The housing 27 is preferably made of a material having a greater coefficient of expansion than that of the rotors because the temperature of the housing ordinarily will become lower than that of the rotors.

In order to obtain small thermal movements of the rotors they should in accordance with the invention be cooled to a metal surface temperature of the order of 100° C. to 400° C. As a consequence thereof unusual and expensive materials (exotic materials) will not be necessary. Preferably, the surface of the rotors should have an insulation of ceramics, porous material or the like. The thickness of the insulation depends on what thickness can be used without cracking or detaching of the insulation.

In accordance with the invention cooling air from the compressors is utilized for insulating as far as possible the surfaces of the rotors relative to the hot motive fluid. This insulation is effected in accordance with the principles known from gas turbines and is referred to as veil cooling and boundary layer cooling. The cooling air will also be utilized as sealing air in the clearance space between the ends of the rotors and the end walls of the housing.

The combustion chamber 16 is in a known manner connected directly on top of the housing and has its outlet duct 30 extending down into the inlet port 31 of the housing to form a cooling passage 32 around the duct 30. The cooling air has a temperature of 300–600° C. after the heat exchanger and is led through a conduit 61 to the cooling passage 32 for cooling the duct and for forming a normal veil cooling after the outlet end of the duct 30.

The hot gases from the combustion chamber 16 may be readily distributed for obtaining thick layers of cooling air on the tops of the lobes and at their roots so as to obtain a pronounced temperature peak in the space between the lobes.

As will be seen from FIGS. 2, 3 and 4, the end wall 33 at the high temperature end of the housing is provided with circular arc grooves 34, 35, 36, 37 concentric with the shafts 28, 29 of the rotors. The grooves are indicated with dotted lines in FIGS. 3 and 4 to indicate their positions in the end wall 33 in relation to the rotors.

The upper groove, 34 and 36 respectively, at each rotor is connected through channels, not shown, with the supply conduit 17 from the high pressure compressor 12 for bleeding sealing and cooling air from the same at a temperature of about 300° C.

The lower grooves, 35 and 37 respectively, at each rotor is connected through channels, not shown, with the supply conduit 18 for bleeding sealing and cooling air from the low pressure compressor 10.

Each lobe of the rotors is at its high temperature end, shown in FIGS. 3 and 4 respectively, provided with substantially radial grooves 38 which have their radially inner ends located at about the same radial distance from the centres of the rotors as the radius of the circular arc grooves 34, 35, 36, 37 so that the radial grooves will communicate with the circular arc grooves upon rotation of the rotors. As shown in the drawings the outer ends of the radial grooves are located near the tops of the lobes.

As will be seen from FIG. 3 the rotor ends may also be provided with a number of short radial grooves 39 communicating with the circular arc grooves and opening close to the root of the respective lobe.

The flow of cooling air supplied to the circular arc grooves in the end wall and to the radial grooves in the ends of the rotors and over the ends of the rotors, respectively, are indicated by small arrows in the figures.

As shown in FIGS. 2 and 3, each lobe may further be provided with an axial cooling channel 40 communicating with the circular arc grooves 34, 35, 36, 37, respectively, in the end wall to receive cooling air and to lead cooling air to one or more radial channels 41, 42 which extend to the top of the respective lobe and end in relatively small holes at the sealing strips 43 of the rotors.

As will be seen from FIG. 4 a recess or hole 44 indicated by dotted lines may be provided in the end wall 33 in such a position that it will fully open into that pocket which is formed between each male lobe and the cooperating female groove when the male rotor has been moved a certain angle, about 45°, from its middle position where it is in complete mesh with the female rotor at the inlet end of the rotors. This position is indicated by a crescent-shaped pocket 145 formed by one flank of the male lobe and the opposite female groove. A corresponding hole or recess 44 as that shown in FIG. 4 for the high pressure end, may also be provided in the end wall at the low pressure end (not shown).

Although not shown in the drawings the recess or hole 44 at the high pressure end may be connected with the upper circular arc grooves 34, 36, whereas the corresponding recess in the end wall at the low pressure end may be connected with the lower circular arc grooves 35, 37 at this end.

The cooling air entering the circular arc grooves in the end wall and the radial grooves in the ends of the rotors will leak into the clearance space between the end wall 33 and the rotors 23, 24 so as to cool the end surfaces of the rotors and the end wall and to form sealing air.

The advantage of bleeding cooling air from the low pressure compressor is that the efficiency of the power unit is merely inconsiderably lowered thereby, and further such air is heated when used for cooling the screw turbine and is then mixed with the outlet gases of the screw turbine to develop power in an exhaust gas turbine when such turbine is used.

The cooling air passing through the short radial grooves 39 in the ends of the rotors will be directed against the inlet flanks of the lobes as shown in FIG. 3.

The cooling air from the grooves 39 which air sweeps along the flanks of the rotors at the end portions of the rotors and the air sweeping along the top portions of the male lobes over some portion of their axial length, will adhere to the lobe surfaces and forms an insulating layer in order to reduce the temperature of the boundary layer. In order to obtain this effect the outlet holes of the radial channels should be of small dimensions.

Part of the cooling air is also utilized for cooling the bearings 130, 131 of the rotor shafts as indicated in FIG. 2, said bearings being cooled mainly by cooling air from the intermediate cooler 14. A housing for synchronizing wheels is denoted by 131a.

The lobe profiles illustrated in FIG. 3 are diagrammatic, whereas the lobe profiles in FIG. 4 are of a specific and preferred configuration resulting in relatively narrow male lobes which enable relatively wide female lobes as well as small pockets between the male lobe and the corresponding female groove when the male lobe is in complete mesh with the groove, such pocket enabling cooling air to be blown into the space formed by the pocket.

As to the cooling obtained by liquid cooling, only less than half of the surface of the housing is liquid cooled. The remaining portion is insulated by providing a freely expansible gas collector 45 as indicated in FIG. 3. The liquid cooling channels in the barrel walls 46, 47 of the housing shown in FIG. 3 are located at the outlet end, whereas these channels at the inlet end have their bottoms 48, 49 located at about half the height of the housing as indicated in FIG. 3.

Cooling liquid is circulated through the channels 50, 51 in the barrel of the housing as well as in channels 52, 53, 54 in the end walls to obtain, in combination with the air cooling, a metal temperature between 100° C. and 400° C.

For liquid cooling of the central hub portions of the rotors there is provided in each hollow rotor shaft 28, 29 a central pipe 55 for supply of cooling liquid to the inner end of the bore of the shaft and recirculating the liquid through the space between the pipe 55 and the bore as indicated by arrows in FIG. 2. The right hand end of the shaft bore in FIG. 2 is blocked off by means of a plug or similar member, not shown.

The exhaust gas collector 45 has a large clearance, of the order of 3 mm., with respect to the rotors and receives directly exhaust gases from the expansion chambers between the rotors. The collector 45 should further be formed with ducts for utilizing the toe energy at the expansion. This energy is converted into velocity and passes through a separate duct (puff-outlet) to the exhaust gas turbine. In machines of the kind under consideration it is common practice that the outlet results in losses of exhaust gases, so called toe energy upon the opening of the rotors.

In order to eliminate this inconvenience the exhaust gas outlet 57 in the screw rotor machine according to the invention is formed with an additional outlet 56 which results in a pre-opening of the gas outlet 57 and which permits the gas to exhaust when the gas outlet 57 is still closed due to the mutual positions of the rotors. This so called pre-opening results in that the remaining toe energy in the exhaust gases may be utilized, and this energy may, due to pressure-drop, be transferred into an increase of the gas velocity. The exhaust gases may then at the beginning flow through a separate channel 56 which later on is united with the outlet channel 57.

The gas velocity in the outlet 56 is considerably greater than in the outlet 57 and thus it is believed that the gases flowing out from the respective outlets do not mix with each other. However, if they are mixed the increase of the velocity will be reduced in the outlet portion and thus the loss due to the mixing will be reduced.

The outlet according to the invention may alternatively be provided at the high pressure or low pressure end of the screw rotor machine and with respect to this, FIG. 2 shows an embodiment which merely is an example of the invention. The outlet 57 is preferably dimensioned for a velocity of about 100 m./sec., said velocity being rapidly accelerated by means of the shape of the nozzle up to about 300 m./sec. to avoid losses. The velocity in the inlet volute of the exhaust gas turbine 11 should be about 400 m./sec. to permit more effective utilization of the release in the outlet 56. The final expansion in the exhaust gas turbine may take place between preferably adjustable guide vanes. With guide vanes a higher turbine efficiency is obtained than with a volute only. For certain purposes guide vane control may be necessary both in the exhaust gas turbine and in the inlet and outlet of the low pressure compressor.

The bearings of the male rotor shown in FIG. 2 are resiliently suspended so as to be able to compensate for thermal expansion. The thrust bearing is located near the front end wall 33 resulting in that very small clearances can be provided between the housing and the rotors. On the other hand, a certain thermal expansion has to be taken into account. For this reason an insulating plate 58 is inserted which can freely expand in radial direction and has a great clearance with respect to the ends of the rotors. In order to reduce end leakage, a small yielding plate 59, having less clearance may be provided at the place where pressure still remains in the spaces between the lobes.

The cut off for the screw turbine may be for instance about ⅓. The inlet channel 31 is devised such as to exert a resistance to flow as small as possible, and to this end the inlet is preferably of the axial-radial type, as shown in FIG. 2. With the cut off indicated the outlet 57 opens such that a comparatively high toe work remains to be utilized as mentioned above.

The efficiencies of the screw compressor and screw turbine may be assumed to be 70% mainly due to the fact that the speed of the compressor is probably higher than the optimum speed so as to obtain small dimensions, and due to the fact that the clearances are larger than normal.

It is suitable to bleed air after the low pressure compressor which at a pressure ratio 4:1 gives a temperature of about 200° C. for cooling the rear end wall and rotors of the screw turbine and scavaging the lobes at the outlets. This amount of air is expanded directly in the inlet volute of the exhaust gas turbine so that all of the pressure drop can be utilized.

As will be understood from the above the pressure ratio is 4 at the high pressure compressor 12 whereas the expansion ratio of the screw turbine 13 will be 8:1. Accordingly a considerable power excess will be obtained and the power ratio of such a machine will be more than 50%, i.e. the compressor work is less than the excess work. For an ordinary gas turbine, however, the compressor work is considerably greater than the excess work.

The high specific power of the screw engine power unit according to the invention will result in that the intermediate cooler 14 as well as the heat exchanger 15 will have small dimensions.

The above description has reference to a power unit of medium size, especially for vehicles. In larger units, the pressure of the motive fluid should be increased by using a greater number of compressors and turbines.

What I claim is:

1. A method of cooling a screw turbine in a screw engine power unit which has at least one compressor for feeding a combustion chamber in which a high temperature medium, having an outlet temperature of more than 1200° C. and preferably about 1500° C., is generated for feeding said screw turbine, characterized in that the high temperature medium can be utilized as a driving medium for the screw turbine by employing a combined air and liquid cooling for the screw turbine, said combined cooling comprising the steps of:
   circulating a cooling liquid through a casing portion of said screw turbine and through central portions of rotors of said screw turbine, and simultaneously
   supplying air from an air system of said screw engine power unit to the screw turbine to provide insulating air layers for the peripheral and end surfaces of the rotors and for the casing by forming a combined veil, boundary layer, and blocking air form of cooling.

2. Method according to claim 1, characterized in that the supply of cooling media with respect to temperature and rate of flow is controlled in such a manner that the housing and rotors upon operation will obtain a metal temperature of the order of 100° C. to 400° C.

3. Method according to claim 1, and including the step of taking air from a high pressure compressor of the screw wheel type and leading the air to the high temperature side of the screw turbine and there employing said air as cooling and blocking air.

4. Method according to claim 1, and including the step of taking air from a low pressure compressor and leading the air to the low temperature side of the screw turbine and there employing said air as cooling and blocking air.

5. Method according to claim 1, and including the step of taking air from a high pressure compressor connected with a heat exchanger of the screw engine power system through which heat exchanger the air is led to the screw turbine for cooling of its inlet and housing and the lobes of the rotors.

6. Method according to claim 1, characterized in that air is taken after an intermediate cooler which is interconnected between a low pressure compressor and a high pressure compressor, and leading the air to the screw turbine in order there to be used as cooling air at the bearings of the rotors.

7. A cooling system for screw turbines of the type having a pair of inter-engaging male and female rotors having screw-shaped and inter-engaging lobes and grooves for forming expansion chambers which receive hot motive fluid from an inlet on one side of a housing of the screw turbine and which exhaust expanded motive fluid to an outlet located on the opposite side of the turbine housing, the improvement comprising cooling-liquid channels in the central portions of the rotors and in the longitudinal half of the housing located on the same side as the inlet to the housing, and cooling-air channels, some of which having their outlets opening into the intermediate space between the end walls of the housing and the ends of the rotors so that the air will be utilized at this place as cooling and blocking air, and some of which extend into the rotors and have their outlets in small holes at the tops of the rotor lobes in order to produce a boundary layer cooling at least at the high temperature end of the turbine.

8. Screw turbine according to claim 7, characterized in that a cooling air channel opens in an end wall which is located at the inlet of the housing and is so provided that this cooling air channel will direct cooling air flow into pockets which are formed between the sides of the lobes upon certain rotation of the same from their middle position to a position where they are in complete engagement with each other.

9. Screw turbine according to claim 7, characterized in that the end surfaces of the lobes of the rotors are provided with open, preferably radial, grooves in order to supply cooling air to the outer portion of the respective lobe, and in that the end walls of the housing are provided with preferably annular segmental grooves forming transmission places for cooling air to the radial grooves in the end surfaces of the lobes.

10. Screw turbine according to claim 9, characterized in that at least the lobes of the male rotors are, at least at their length portion located adjacent the inlet end, provided with preferably radial cooling air channels which open at the tops of the lobes and which through axial channels in the rotors communicate with the annular grooves in the end walls of the housing.

11. Screw turbine according to claim 7 having an exhaust gas turbine connected to the outlet of the screw turbine, characterized in that the outlet includes a separate channel which is directly connected to the outlet side of the rotors for forming a so-called puff-outlet which in its turn is connected to the exhaust gas turbine for utilizing the residual toe energy in the exhaust gases.

12. Screw turbine according to claim 7, characterized in that the bearings of the rotors are spring-supported in order to compensate for heat expansion.

13. Screw turbine according to claim 10, characterized in that a number of radial cooling air channels are distributed along the length of the male rotor and have their openings located at the surface of the lobes.

References Cited

UNITED STATES PATENTS

| | | | |
|---|---|---|---|
| 2,362,550 | 11/1944 | Hansen | 123—8 X |
| 2,459,709 | 1/1949 | Lysholm | 230—143 X |
| 2,467,092 | 4/1949 | Ostermann | 60—20 |
| 2,696,364 | 12/1954 | Bartlett | 253—39.15 |
| 2,782,596 | 2/1957 | Lindhagen et al. | 91—84 X |
| 2,801,792 | 8/1957 | Lindhagen et al. | 230—210 |
| 2,975,963 | 3/1961 | Nilsson | 230—143 |
| 3,307,453 | 3/1967 | Nilsson et al. | 91—84 |

FOREIGN PATENTS

| | | |
|---|---|---|
| 832,386 | 4/1960 | Great Britain. |
| 947,382 | 1/1964 | Great Britain. |

OTHER REFERENCES

Baumeister, Marks' Mechanical Engineers' Handbook, 6th edition, 1958, McGraw-Hill Book Co., Inc., pp. 9–177.

MARTIN P. SCHWADRON, *Primary Examiner.*

G. N. BAUM, *Assistant Examiner.*